United States Patent [19]
Brinkmann et al.

[11] 3,993,708
[45] Nov. 23, 1976

[54] ELASTIC HARDENED EPOXY RESIN POLYMERS

[75] Inventors: Bernd Brinkmann, Bad Zwischenahn; Bernd Neffgen, Cappenberg, both of Germany

[73] Assignee: Schering Aktiengesellschaft, Berlin and Bergkamen, Germany

[22] Filed: Apr. 1, 1975

[21] Appl. No.: 563,970

[30] Foreign Application Priority Data
Apr. 13, 1974 Germany............................ 2418041

[52] U.S. Cl. .................... 260/830 P; 260/77.5 AM
[51] Int. Cl.$^2$ ........................................ C08L 63/00
[58] Field of Search ........ 260/2 N, 77.5 AM, 830 P, 260/835

[56] References Cited
UNITED STATES PATENTS

| | | |
|---|---|---|
| 3,378,600 | 4/1968 | Hodges ............................. 260/2 N |
| 3,384,679 | 5/1968 | Stetz ................................ 260/830 P |
| 3,420,800 | 1/1969 | Haggis ......................... 260/77.5 AM |
| 3,442,856 | 5/1969 | Floyd ................................ 260/2 N |
| 3,547,886 | 12/1970 | Gardner ............................ 260/2 N |
| 3,636,133 | 1/1972 | Hawkins .......................... 260/830 P |
| 3,715,338 | 2/1973 | Schmelzer .................. 260/77.5 AM |

*Primary Examiner*—Paul R. Michl
*Attorney, Agent, or Firm*—Curtis, Morris & Safford

[57] ABSTRACT

Elastic hardened epoxy resin polymers prepared by the reaction of a liquid polyepoxy resin with the amino-terminated hydrolysis products of enamine- or ketimine-terminated adducts formed by reacting a polyalkylene ether glycol with a polyisocyanate to form a polyether urethane and then reacting the polyether urethane with an enamine or ketimine having an hydroxy group.

11 Claims, No Drawings

ELASTIC HARDENED EPOXY RESIN POLYMERS

The present invention relates to elastic hardened epoxy resin polymers and methods of making the same, and to hardenable epoxy resin compositions for preparing said polymers.

More in particular, the invention relates to elastic epoxy resin polymers which are weakly cross-linked by longchain polyetherurethane-amines and which are resistant to chemicals and adhere well to a substrate.

Epoxy resins have for quite some time found wide use in the preparation of coatings for protection against corrosion, abrasion-resistant coatings, sealing compounds, and adhesives which have outstanding mechanical strength and good resistance to chemicals. Because of their high cross-linking density, amine-hardened epoxy resins, above all those comprising diphenylolpropane and epichlorohydrin, are brittle and hard and have a glass transition region above 20° C.

In practice, the great hardness and high strength of amine-hardened epoxy resins are not always necessary. Rather, an elasticizing and a decrease in brittleness are often desired. To bring this about, heretofore a number of different, but not always satisfactory methods, have been employed.

In principle, the degree of elasticization can be increased internally by decreasing the density of cross-linking and externally by the addition of plasticizers.

External elasticizing agents are not reactive and are not incorporated into the polymer network. They effect an expansion of the polymer network only by occupying space. Tar, phthalic acid esters, high boiling alcohols, glycols, ketone resins, vinyl polymers, and similar products which are not reactive with epoxy resins and amine hardeners are typical external plasticizers. This kind of modification is suitable only for certain intended uses. It scarcely contributes anything to elasticization since the glass transition region is only insignificantly affected, while the polymer structure is strongly disturbed.

An internal elasticization of epoxy resins can take place by reduction in the functionality of the hardener, as described, for example, in German Offenlegungsschrift 2,200,717.

Aminoamides of dimeric and trimeric fatty acids, which are long chain and of low functionality, have a spectrum of properties satisfactory for use as soft hardeners for epoxy resins, have been known for a long time and have been considerably used in practice. However, because of certain deficiencies, these materials are not as universally employable as would be desirable.

It is also known from German pat. no. 1,090,803 to modify this system by the use of polyurethanes. A further development in the direction of elasticized synthetic resins is shown for this system in German Offenlegungsschrift 2,152,606.

A process has now been found for the preparation of elasticized polymers, particularly shaped parts and sheet structures, by the reaction of epoxy compounds having more than one epoxy group per molecule, optionally in the presence of monoepoxy compounds, with certain hardening agents or hardening agent mixtures, optionally in the presence of further additives. As the hardening agent or hardening agent mixture is used:

a. an adduct produced by the reaction of
  1. a polyalkylene ether polyol with molecular weights from 500 to 10000, and
  2. a polyisocyanate, including diioscyanates, wherein the ratio of NCO groups/OH groups is from 1.5:1 to 2.5:1, and by further reaction of the adduct so obtained with
  3. a ketimine or enamine containing hydroxy groups, wherein the ratio of NCO groups/OH groups is 1:1; or
b. an amine compound obtained by hydrolysis of the ketimine or enamine adduct prepared according to (a).

For hardening agent mixtures which contain compounds according to (a), the action of corresponding amounts of water for hydrolysis of the ketimine or enamine is necessary.

A further feature of the invention is hardening agents for elastic epoxy resins, said agents comprising one of the aforementioned components (a) or (b).

A still further feature of the invention is storage-stable epoxy resin mixtures which are hardenable in the presence of water to form elastic epoxy polymers and which comprise:

a. an epoxy compound having more than one epoxy group per molecule, an epoxy value from 0.13 to 0.6, and a molecular weight between 300 and 1500, optionally in admixture with a monoepoxy compound, and an approximately stoichiometric amount of
b. a hardening agent which is an adduct as described in (a) above. Such mixtures may additionally comprise further additives such as pigments, fillers, plasticizers, and solvents.

The amino-terminated polyurethane hardening agents of the invention are obtained by the reaction of an isocyanate pre-adduct with a ketimine or enamine containing hydroxy groups.

The isocyanate pre-adducts are obtained in turn by the reaction of a linear or branched polyalkylene ether polyol, preferably a polypropylene oxide, with a polyisocyanate, including diisocyanates.

The polyalkylene ether polyols are prepared according to known methods and have average molecular weights between 500 and 10000, preferably between 2000 and 5000. Polypropylene oxide is especially preferred.

The following may be mentioned as exemplary of suitable polyisocyanates: 2,4- and 2,6-toluene diisocyanate or mixturess thereof; 4,4'-diphenylmethane diisocyanate; m-xylylene diisocyanate; 2,2,4-(2,4,4) trimethylhexamethylene diisocyanate; 1,6-hexamethylene diisocyanate; 1-isocyanato-3-isocyanatomethyl-3,5,5-trimethyl cyclohexane (also known as isophorone diisocyanate); and the addition product of 1 mol of trimethylolpropane and 3 mols of isophorone diisocyanate.

Aliphatic and cycloaliphatic diisocyanates such as hexamethylene diisocyanate and isophorone diisocyanate are particularly suitable.

For the preparation of preferred pre-adducts, the polyalkylene ether polyol and polyisocyanate are mixed so that an NCO/OH ratio between 1.5 and 2.5:1, preferably, however, of 2:1, is achieved.

The reaction mixture, after the addition of a suitable catalyst, for example 0.1 percent of dibutyl tin dilaurate, is warmed for several hours at 50° – 100° C. until the analytically-determined isocyanate content largely corresponds with the calculated value.

Suitable ketimines or enamines containing hydroxy groups are prepared by the reaction of primary or secondary alkanolamines with aldehydes or ketones and are discussed in greater detail, for example, in German Offenlegungsschrift 2,116,882, incorporated herein by reference (See also U.S. Pat. No. 3,865,791).

The preparation of ketimines containing hydroxyl groups takes place by reacting alkanolamines having a primary amino group and an aliphatic hydroxyl group with aliphatic or cyclic ketones. The reaction may optionally be catalyzed with acid, may take place with either warming or cooling, and may occur with or without a solvent. The water of reaction and the excess carbonyl compound are removed.

The preparation of enamines containing hydroxyl groups is carried out in a corresponding manner by the reaction of alkanolamines having a secondary amino group and an aliphatic hydroxyl group with aliphatic aldehydes or cyclic ketones.

As primary alkanolamines, ethanolamine, 1,3-propanolamine, 1,4-butanolamine, 1,6-hexanolamine, and diglycol amine are suitable, for example. (In syntheses using 1,2- and 1,3-alkanolamines, a separation of isomeric 1,3-oxazolidines or perhydrooxazines may be necessary.)

As carbonyl components, aliphatic or cyclic ketones such as methyl isobutyl ketone, diisopropyl ketone, diisobutyl ketone, cyclohexanone, trimethylcyclohexanone, and others can be employed.

As secondary alkanolamines, heterocyclic products are particularly suitable, such as 4-hydroxypiperidine, 1-($\beta$- hydroxyethyl)-piperazine, and 1-($\beta$-hydroxypropyl)-piperazine.

As carbonyl components, cyclic ketones can be used, for example cyclopentanone, cyclohexanone, and trimethyl cyclohexanone, or aldehydes such as n-butyraldehyde, isobutyraldehyde 2-methylpentanal, capronaldehyde, and others.

The reaction takes place by mixing the alkanolamine with an excess of the carbonyl compound. After the addition of an entraining agent and, optionally, an acid catalyst, the reaction mixture is heated in a water separator until water separation is completed. After removal of the entraining agent and the excess carbonyl compound, the residue can optionally be distilled.

The isocyanate pre-adduct is then mixed, without heating, with the enamine or ketimine containing an hydroxyl group in an NCO/OH ratio of 1:1 and the mixture is stirred until no NCO bands are detectable in the infrared spectrum.

For the epoxy hardening reaction according to the invention, these pre-adducts having ketimine or enamine end groups can be mixed directly with a polyepoxide; or with another, conventional, hardener and polyepoxide, in which case terminal amino groups are hydrolytically formed by residual moisture present or by atmospheric moisture.

However, the amino groups can also be released in freshly-prepared adduct by the introduction of water vapor or by the addition of water with warming. The hydrolysis can be followed spectroscopically in the infrared because of the decrease in the enamine or ketimine bands.

The amino-terminated polyether urethanes so obtained can also be mixed with commercial amine hardeners as described in Lee-Neville, Handbook Of Epoxy Resins, McGraw-Hill Book Company, New York 1967, chapter 7 having at least two reactive amine hydrogens to form storage-stable products. In this way, the viscosity of the polyether urethane is considerably decreased and the reactivity of the mixture on combination with epoxy resins is increased. The large number of conventional amine hardeners, having differing functionalities and viscosities, which can be so employed provides a very large region of variation in which working-up techniques and polymer properties can be adjusted.

Examples of such conventional amine hardeners are: aliphatic amines, e.g. polyethylene polyamines and polypropylene polyamines like diethylene triamine and dipropylene triamine; cycloaliphatic diamines such as 1-isocyanato-3-isocyanatomethyl-3,5,5-trimethyl-cyclohexane (isophorone diamine) and 3,3'-dimethyl-4,4'-diamino-dicyclohexylmethane; heterocyclic amines such as piperazine; long-chain polyether amines such as 1,12-diamino-4,8-dioxadodecane; aromatic amines such as phenylene diamine and diamino-diphenylmethane; polyamidoamines from natural or synthetic fatty acids and polyamines; amine adducts; and phenolaldehyde amine condensates.

For the preparation of one-component mixtures with epoxy resins, other compounds which form amines by hydrolysis, such as ketimines or enamines per se, can also be combined with the aforementioned polyether urethanes having ketimine or enamine end groups.

The hardeners can be formulated in the usual way with the optional addition of viscosity regulators; accelerators such as tertiary amines, triphenyl phosphite, or alkylphenols; or with rapid hardeners such as the Mannich bases.

According to the present invention, epoxy resins are hardenable with these hardeners or hardener mixtures when either hot or cold. In general, the epoxy compounds contain more than one epoxy group in the molecule and can be glycidyl ethers of polyvalent alcohols such as glycerin, or of hydrated diphenylol propane, or of polyvalent phenols such as resorcinol, diphenylol propane, or phenol-aldehyde condensates. The glycidyl esters of polyvalent carboxylic acids such as hexahydrophthalic acid or dimerized fatty acids can also be employed.

A preferred embodiment employs liquid epoxy resins made from epichlorohydrin and diphenylolpropane and having a molecular weight from 340 to 450.

Monofunctional epoxy compounds can optionally be present to decrease the viscosity of the mixtures and thus improve workability. Examples of such compounds are aliphatic and aromatic glycidyl ethers such as butyl glycidyl ether, phenyl glycidyl ether, glycidyl esters such as glycidyl acrylate, or epoxides such as styrene oxide.

The combination of a long-chain, weakly cross-linking polyether urethane amine, polyether urethane ketimine, or polyether urethane enamine with a highly cross-linking conventional amine formulation makes it possible to adjust the properties of the reactive resin mass over a wide range with respect to its viscosity, reactivity, and the like, and also makes it possible to vary the properties of the resultant polymer with respect to elasticity, cross-linking density, mechanical strength, and chemical resistance.

For the formulation of a resin mass useful for coating, adhesion, or for sealing, conventional fillers (which may be mineral or organic), pigments, plasticizers, accelerators, solvents, and other auxiliaries can be employed.

The mixtures according to the present invention can be used to particular advantage where good adherence to a substrate, good chemical resistance, and elasticity for bridging over cracks in a substrate and for decreasing internal tensions is necessary.

An important field of use is for the coating of concrete, for example fuel oil tanks. Because of their superior adhesion to iron and concrete, as well as their adjustable elasticity, the mixtures of the present invention are suitable as sealing compounds for joints and as adhesives with a high adhesion. Since the compounds harden with little shrinkage or development of strain, they also permit the preparation of shaped bodies of large dimensions.

A better understanding of the present invention and of its many advantages will be had by referring to the following specific examples given by way of illustration.

I. PREPARATION OF THE HARDENING ADDUCTS

EXAMPLE 1 a. 800 g of 1-(2-hydroxyethyl)-piperazine are heated with 443 g of isobutyraldehyde and 400 ml of toluene in a water separator until an almost quantitative yield of water is obtained (ca. 110 g). The reaction time is about 8 – 13 hours. The solvent is removed and the residue is distilled in vacuum. The distillate has a nitrogen content of 15.2 percent and is sufficiently pure for further use.

b. 6754 g of a trifunctional polypropylene glycol having an hydroxy number of 35.6 are mixed with 746 g of toluene diisocyanate-2,4 and heated with stirring for two hours at 70° C. and then for a further hour at 80° C. The reaction product has an isocyanate content of 2.6 percent by weight.

870 g of the enamine prepared according to (a) are then stirred into this product, which has been cooled to room temperature. After the mixture has stood ca. 12 – 14 hours, no more free isocyanate can be detected by infrared spectroscopy.

Before further use as an elasticizing hardener component for polyepoxides, this product is combined with more than a stoichiometric amount of water and stirred at about 50° C. until the infrared spectrum shows the complete decomposition of the enamine groups. The product has an equivalent weight of 1830.

EXAMPLE 2 a. 390 g of 1-(2-hydroxyethyl)-piperazine and 570 g of 3,3,5(3,5,5)-trimethylcyclohexanone (isomeric mixture) are combined with 300 ml of toluene and 2 ml of formic acid and heated with stirring under nitrogen in a water separator. After 16 hours about 90 percent of the calculated amount of water has been removed. The solvent and excess trimethylcyclohexanone are removed in vacuum and the residue is distilled.

b. 2000 g of a cross-linked polypropylene glycol with an OH number of 35.8 are combined with 223 g of toluene diisocyanate-2,4 and 0.2 g of dibutyl tin dilaurate and then warmed with stirring over a period of an hour to 50° C. and held at this temperature for one further hour. The reaction product has an isocyanate content of 2.25 percent.

The product, after cooling to room temperature, is combined with stirring with 300 g of the enamine prepared according to part (a). After about 12 hours, no free isocyanate can be detected by infrared spectroscopy. The product has an equivalent weight of 2100.

EXAMPLE 3

A mixture of 5040 g of a branched polypropylene glycol having an hydroxy number of 35.6 and 711 g of isophorone diisocyanate is combined with 5.7 g of dibutyl tin dilaurate and stirred under nitrogen for 3 hours at a temperature of 75° C. The reaction product has an isocyanate content of 2.2 percent by weight, corresponding to an equivalent weight of 1914.

EXAMPLE 4 a. 324 g of diglycol amine are combined with 300.5 g of methyl isobutyl ketone and 300 ml of benzene. Then the mixture is heated on a water separator under nitrogen till water separation is complete. The solvent is drawn off and the residue distilled in vacuum.

b. 1000 g of the isocyanate pre-adduct prepared in Example 3 are combined with stirring and cooling with 97.8 g of the ketimine whose preparation is described above in (a). The materials are stirred for about a further 4 hours until no free isocyanate can be detected in the infrared spectrum. Then somewhat more than the stoichiometric amount of water is added and the mixture stirred so long at 50° C. till the ketimine band in the infrared spectrum at 1675 cm$^{-1}$ has disappeared. The product has an equivalent weight of 2100.

II. EXAMPLES OF USE

EXAMPLE 5 - PREPARATION OF AN ELASTIC SEALING COMPOUND 650 parts by weight of the adduct prepared in Example 2(b) are mixed with 58 parts by weight of a liquid diepoxy compound prepared from 4,4'-dihydroxydiphenylpropane-2,2(diphenylolpropane) and epichlorohydrin (molecular weight about 380 viscosity at 25° C about 100P). After the addition of 500 parts by weight of trioctyl phosphate and 70 parts by weight of nonyl phenol, about 230 parts by weight of finely divided silicic acid are worked in.

With exclusion of moisture, a sample of the mixture can be stored unchanged for several months. A sample applied as a paint forms a skin on its surface within 24 hours and hardens in the course of the following 21 days to an elastic product having a Shore A hardness of about 20.

A third sample, stored for several weeks, has an extension at break of 150 percent at 23 kg/cm$^2$ (according to DIN 53504).

EXAMPLE 6 - PREPARATION OF AN ELASTICIZED ADHESIVE 16.7 parts by weight of the product, having diprimary terminal amine groups, produced in Example 4(b) were mixed with 50 parts by weight of a conventional polyaminoamide hardener prepared from dimerized tall oil fatty acid and triethylenetetra amine (amine number about 400 viscosity at 25° C about 100p) and 100 parts by weight of an epoxy resin as in example 5. Test strips on sheet steel were adhered to one another and, after hardening for 7 days at 23° C., were subjected to a tensile shear test (DIN 53 283). The tensile shear strength was 3.3 kg/mm$^2$.

A comparison test with a sample free of polyether amine gave a tensile shear strength under the same conditions of 2.4 kg/mm$^2$.

EXAMPLE 7 - PREPARATION OF AN ELASTICIZED COATING AGENT 55 parts by weight of a modified cycloaliphatic amine as supplied by Schering AG under the trademark Trihädur 43 (amine number ca. 250 viscosity at 25° C about 5P were mixed with 63.4 parts by weight of the diprimary polyether urethane amine of Example 4(b). After the addition of 100 parts by weight of an epoxy resin as in Example 6, a thin film, about 100 microns thick, was applied to sheet metal. The film was hardened to a tackfree condition within seven days. The Erichsen deep drawing test (DIN 53 156) gave a value of 9.2 mm. In a comparison test, a sample free of polyether urethane amine gave values of only 0.4 – 1 mm.

EXAMPLE 8

Example 7 is repeated using as the epoxy resin a mixture comprising 90 parts by weight of the epoxy resin of Example 6 and 10 parts by weight of cresyl glycidyl ether.

A hardened film of the product gave an Erichsen deep drawing test value of 9.6 mm. A sample free of the polyether urethane amine gave values of only 0.8 – 1.5 mm.

What is claimed is:

1. In the method of hardening a liquid epoxy resin having more than one epoxy group per molecule with an approximately stoichiometric amount of an amine hardener, the improvement wherein said amine hardener is the amino-terminated hydrolysis product of an adduct having terminal enamine or ketimine groups, whereby an elastic hardened polymer is obtained, said adduct being prepared by reacting a polyalkylene ether polyol having a molecular weight from 500 to 10000 with a polyisocyanate in amounts such that the ratio of NCO groups to OH groups is from 1.5:1 to 2.5:1 to form a polyether urethane, and then reacting said polyether urethane with an enamine or ketimine containing an hydroxy group in amounts such that the ratio of NCO groups to OH groups is 1:1.

2. The method as in claim 1 wherein said adduct having terminal enamine or ketimine groups is hydrolyzed prior to combination with said liquid epoxy resin.

3. The method as in claim 1 wherein said adduct having terminal enamine or ketimine groups is hydrolyzed after combination with said liquid epoxy resin.

4. The method as in claim 3 wherein said hydrolysis is effected by ambient moisture.

5. The method as in claim 1 wherein said liquid epoxy resin comprises a liquid monoepoxy compound in admixture therewith.

6. The method as in claim 1 wherein said liquid epoxy resin is hardened in the additional presence of a conventional liquid amine hardener for epoxy resins.

7. An elastic hardened epoxy resin polymer prepared by the method of claim 1.

8. A storage-stable moisture-hardenable epoxy resin composition comprising (1) a liquid epoxy resin having more than one epoxy group per molecule, an epoxy value from 0.13 to 0.6 and a molecular weight between 300 and 500 and (2) an approximately stoichiometric amount of an adduct having terminal enamine or ketimine groups, said adduct being prepared by reacting a polyalkylene ether polyol having a molecular weight from 500 to 10000 with a polyisocyanate in amounts such that the ratio of NCO groups to OH groups is from 1.5:1 to 2.5:1 to form a polyether urethane, and then reacting said polyether urethane with an enamine or ketimine containing an hydroxy group in amounts such that the ratio of NCO groups to OH groups is 1:1.

9. A composition as in claim 8 wherein said liquid epoxy resin comprises a liquid monoepoxy compound in admixture therewith.

10. The method of making an elastic hardened epoxy resin product which comprises combining the composition of claim 8 with water.

11. The method of claim 10 which comprises exposing said composition to ambient moisture.

* * * * *